3,444,166
NOVEL 1,4,7-TRIS(HALOHYDROCARBYLCAR-
BAMOYL)DODECAHYDRO - 1,4,7,9b-TETRA-
AZAPHENALENES AND 1,4,7 - TRIS(NITRO-
HYDROCARBYLCARBAMOYL)DODECAHY-
DRO-1,4,7,9b-TETRAAZAPHENALENES
Nathan A. Edelson, Philadelphia, Pa., assignor to Monsanto Research Corporation, St. Louis, Mo., a corporation of Delaware
No Drawing. Continuation-in-part of application Ser. No. 445,265, Apr. 2, 1965. This application Aug. 31, 1966, Ser. No. 576,223
Int. Cl. C07d 57/12, 57/18; A01n 9/22
U.S. Cl. 260—256.4
6 Claims

ABSTRACT OF THE DISCLOSURE

Compounds of the following formula

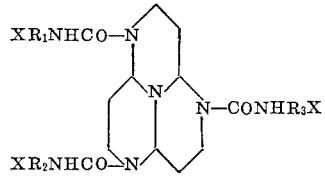

where $R_1$, $R_2$ and $R_3$ is a hydrocarbon radical free of aliphatic unsaturation and containing up to 10 C atoms and X is a halogen atom of atomic weight below 130, or the $NO_2$ radical. The compounds are useful as insecticides and microbiological toxicants and are prepared by the reaction of halohydrocarbon isocyanates and nitrohydrocarbon isocyanates with dodecahydro-1,4,7,9b-tetraazaphenalenes.

---

This application is a continuation-in-part of my copending application, Ser. No. 445,265, filed Apr. 2, 1965, now abandoned.

This invention relates to the reaction of halohydrocarbon isocyanates and nitrohydrocarbon isocyanates with dodecahydro-1,4,7,9b-tetraazaphenalene and to the products thereof.

It is an object of this invention to provide new 1,4,7-tris(halohydrocarbylcarbamoyl)dodecahydro - 1,4,7,9b-tetraazaphenalenes and new 1,4,7-tris(nitrohydrocarbylcarbamoyl)dodecahydro - 1,4,7,9b - tetraazaphenalenes. It is a further object of this invention to provide new compounds useful as insecticides and microbiological toxicants. These and other objects will become apparent as a detailed description of the invention proceeds.

According to the invention, there are prepared new and valuable compounds which are the product of the reaction of halohydrocarbon isocyanates or nitrohydrocarbon isocyanates with dodecahydro-1,4,7,9b-tetraazaphenalene, having the formula:

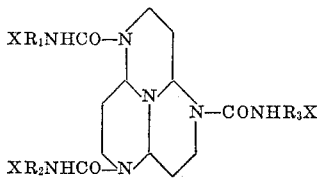

wherein each of $R_1$, $R_2$, and $R_3$ is a hydrocarbon radical free of aliphatic unsaturation and containing up to 10 carbon atoms, and X is a halogen atom of atomic weight below 130, or the $NO_2$ radical.

There are shown below a number of the specific new compounds of the invention. It is not intended that there be a complete listing of all the compounds of the invention, but that it merely be illustrative thereof. Representative compounds wherein X is a halogen radical include:

1,4,7-tris(chloromethylcarbamoyl)dodecahydro-
1,4,7,9b-tetraazaphenalene,
1,4,7-tris(2-bromoethylcarbamoyl)dodecahydro-
1,4,7,9b-tetraazaphenalene,
1,4,7-tris(2-fluoropropylcarbamoyl)dodecahydro-
1,4,7,9b-tetraazaphenalene,
1,4,7-tris(3-iodobutylcarbamoyl)dodecahydro-
1,4,7,9b-tetraazaphenalene,
1,4,7-tris(4-chloropentylcarbamoyl)dodecahydro-
1,4,7,9b-tetraazaphenalene,
1,4,7-tris(2-bromohexylcarbamoyl)dodecahydro-
1,4,7,9b-tetraazaphenalene,
1,4,7-tris(3-fluoroheptylcarbamoyl)dodecahydro-
1,4,7,9b-tetraazaphenalene,
1,4,7-tris(6-iodoheptylcarbamoyl)dodecahydro-
1,4,7,9b-tetraazaphenalene,
1,4,7-tris(5-bromooctylcarbamoyl)dodecahydro-
1,4,7,9b-tetraazaphenalene,
1,4,7-tris(3-fluorononylcarbamoyl)dodecahydro-
1,4,7,9b-tetraazaphenalene,
1,4,7-tris(6-chlorodecylcarbamoyl)dodecahydro-
1,4,7,9b-tetraazaphenalene,
1,4,7-tris(2-bromocyclobutylcarbamoyl)dodecahydro-
1,4,7,9b-tetraazaphenalene,
1,4,7-tris(3-chlorocyclohexylcarbamoyl)dodecahydro-
1,4,7,9b-tetraazaphenalene,
1,4,7,-tris(3-iodocyclopentylcarbamoyl)dodecahydro-
1,4,7,9b-tetraazaphenalene,
1,4,7-tris(2-fluoro-3-butylcyclohexylcarbamoyl)dodeca-
hydro-1,4,7,9b-tetraazaphenalene,
1,4,7-tris(4-chloro-2-pentylcyclobutylcarbamoyl)dodeca-
hydro-1,4,7,9b-tetraazaphenalene,
1,4,7-tris(2-iodo-2-ethylcyclopentylcarbamoyl)dodeca-
hydro-1,4,7,9b-tetraazaphenalene,
1,4,7-tris(3-chlorobenzylcarbamoyl)dodecahydro-
1,4,7,9b-tetraazaphenalene,
1,4,7-tris(4-iodobenzylcarbamoyl)dodecahydro-
1,4,7,9b-tetraazaphenalene,
1,4,7-tris(2-fluorobenzylcarbamoyl)dodecahydro-
1,4,7,9b-tetraazaphenalene,
1,4,7-tris(o-chlorophenylcarbamoyl)dodecahydro-
1,4,7,9b-tetraazaphenalene,
1,4,7-tris(m-bromophenylcarbamoyl)dodecahydro-
1,4,7,9b-tetraazaphenalene,
1,4,7-tris(p-bromophenylcarbomyl)dodecahydro-
1,4,7,9b-tetraazaphenalene,
1,4,7-tris(o-iodophenylcarbamoyl)dodecahydro-
1,4,7,9b-tetraazaphenalene,
1,4,7-tris(3-chlorotolylcarbamoyl)dodecahydro-
1,4,7,9b-tetraazaphenalene,
1,4,7-tris(3-bromotolylcarbamoyl)dodecahydro-
1,4,7,9b-tetraazaphenalene,
1,4,7-tris(2-iodotolylcarbamoyl)dodecahydro-
1,4,7,9b-tetraazaphenalene,
1,4,7-tris(3-fluoroxylylcarbamoyl)dodecahydro-
1,4,7,9b-tetraazaphenalene,
1,4,7-tris(4-chloroxylylcarbamoyl)dodecahydro-
1,4,7,9b-tetraazaphenalene, and so forth.

Representative compounds wherein X is the nitro radicals include:

1,4,7-tris(nitromethylcarbamoyl)dodecahydro-1,4,7,9b-
tetraazaphenalene,
1,4,7-tris(nitroethylcarbamoyl)dodecahydro-1,4,7,9b-
tetraazaphenalene,
1,4,7-tris(nitropropylcarbamoyl)dodecahydro-1,4,7,9b-
tetraazaphenalene,
1,4,7-tris(nitrobutylcarbamoyl)dodecahydro-1,4,7,9b-
tetraazaphenalene, 1,4,7-tris(nitropentylcarbamoyl)dodecahydro-1,4,7,9b-tetraazaphenalene,
1,4,7-tris(nitrohexylcarbamoyl)dodecahydro-1,4,7,9b-tetraazaphenalene,
1,4,7-tris(nitroheptylcarbamoyl)dodecahydro-1,4,7,9b-tetraazaphenalene,
1,4,7-tris(nitrooctylcarbamoyl)dodecahydro-1,4,7,9b-tetraazaphenalene,
1,4,7-tris(nitrodecylcarbamoyl)dodecahydro-1,4,7,9b-tetraazaphenalene,
1,4,7-tris(nitrocyclobutylcarbamoyl)dodecahydro-1,4,7,9b-tetraazaphenalene,
1,4,7-tris(nitrocyclopentylcarbamoyl)dodecahydro-1,4,7,9b-tetraazaphenalene,
1,4,7-tris(nitrophenylcarbamoyl)dodecahydro-1,4,7,9b-tetraazaphenalene,
1,4,7-tris(nitrotolylcarbamoyl)dodecahydro-1,4,7,9b-tetraazaphenalene,
1,4,7-tris(nitroxylylcarbamoyl)dodecahydro-1,4,7,9b-tetraazaphenalene, and so forth.

An examination of the above listed compounds only as to the nuclear substitution indicates that not every one of the possible novel compounds of the invention is named specifically. Nevertheless, it is intended to cover all compounds covered by the general formula but not specifically named.

The halohydrocarbonisocyanates and nitrohydrocarbon isocyanates are known compounds which may be readily prepared by a variety of methods. Methods suitable for preparing the halohydrocarbon isocyanates include the vapor phase reaction of phosgene and a primary halogen-substituted amine as well as the pyrolysis of a halogen-substituted acyl azide, and other methods obvious to those skilled in the art.

Methods suitable for preparing the nitrohydrocarbon isocyanates include the vapor phase reaction of phosgene and a primary nitro-substituted amine, and other methods obvious to those skilled in the art.

In preparing the compounds of this invention, haloaliphatic isocyanates and haloalicyclic isocyanates and nitroaliphatic and nitroalicyclic isocyanates can be employed. Suitable haloaliphatic and haloalicyclic isocyanates which may be used are, for example, chloromethyl isocyanate, 2-bromoethyl isocyanate, 2-fluoropropyl isocyanate, 3-iodobutyl isocyanate, 4-chloropentyl isocyanate, 2-bromohexyl isocyanate, 3-fluoroheptyl isocyanate, 6-iodoheptyl isocyanate, 5-bromooctyl isocyanate, 3-fluorononyl isocyanate, 6-chlorodecyl isocyanate, 2-bromocyclobutyl isocyanate, 3-chlorocyclohexyl isocyanate, 3-iodocyclopentyl isocyanate, 2-fluoro-3-butylcyclohexyl isocyanate, 4-chloro-2-pentylcyclobutyl isocyanate, 2-iodo-2-ethylcyclopentyl isocyanate, and so forth. The presently useful haloaromatic isocyanates include: 3-chlorobenzyl isocyanate, 4-iodobenzyl isocyanate, 2-fluorobenzyl isocyanate, o-chlorophenyl isocyanate, m-bromophenyl isocyanate, p-bromophenyl isocyanate, o-iodophenyl isocyanate, 3-chlorotolyl isocyanate, 3-bromotolyl isocyanate, 2-iodotolyl isocyanate, 3-fluoroxylyl isocyanate, 4-chloroxylyl isocyanate, and so forth.

Suitable nitroaliphatic and nitroalicyclic isocyanates which can be used include nitromethyl isocyanate, nitroacetyl isocyanate, nitropropyl isocyanate, nitrobutyl isocyanate, nitropentyl isocyanate, nitrohexyl isocyanate, nitroheptyl isocyanate, nitrooctyl isocyanate, nitrononyl isocyanate, nitrodecyl isocyanate, nitrocyclobutyl isocyanate, nitrocyclohexyl isocyanate, nitrocyclopentyl isocyanate, nitrobutylcyclohexyl isocyanate, nitropentylclobutyl isocyanate, nitroethylcyclopentyl isocyanate, and so forth. Useful nitroaromatic isocyanates include: nitrobenzyl isocyanate, nitrophenyl isocyanate, nitrotolyl isocyanate, nitroxylyl isocyanate, and so forth.

The method of U.S. 3,112,315 may be used to prepare the dodecahydro-1,4,7,9b-tetraazaphenalene, the preparation of which consists in the treatment of acrolein with ammonia in methanol to give compounds which are then hydrogenated by Raney nickel, for example.

In carrying out the process of this invention, the halohydrocarbon isocyanate or nitrohydrocarbon isocyanate is simply contacted with the dodecahydro-1,4,7,9b-tetraazaphenalene until reaction is complete. Generally, the reaction proceeds readily at room temperature, but the reaction mixture may even be advantageously cooled, at least initially; it is also an advantage in moderating the reaction to add one of the reactants slowly and gradually to the other, though the reactants may alternatively be mixed all at once, optionally, though not necessarily, together with a solvent or diluent. Solvents or diluents which may be employed to moderate the reaction and/or to facilitate stirring the mixture, and so forth, are, for example, tetrahydrofuran, dimethylsulfoxide, dioxane, and the like. The exact ratio of the reactants is not critical, but since the reaction takes place by condensation of three moles of halohydrocarbon isocyanate or nitrohydrocarbon isocyanate with one mole of dodecahydro-1,4,7,9b-tetraazaphenalene, advantageously a 3:1 ratio of reactants is employed. However, if desired, an excess of the more readily available component may be used, to assure complete reaction of the less readily available component. Excess reactant can then be removed at the end of the reaction by, for example, extraction or distillation.

Useful temperatures are, for example, the reflux temperature of the reaction mixture, where solvents are employed, or from any desired temperature below the decomposition point of the ingredients of the reaction mixture to below 0° C. Atmospheric pressure is satisfactory for conducting the reaction, though sub- or superatmospheric pressures may be used if desired.

Catalysts may be used, if desired; however, these reactions generally proceed with sufficient rapidity so as not to require the use of a catalyst. Time is not critical; in general, it will depend upon the nature of the reactants used and on the temperature of the reaction. Ordinarily reaction times will vary from less than one minute to several hours. Higher yields may be obtained if the reaction occurs in the presence of an inert gas rather than in the presence of oxygen; examples of suitable inert gasses are, for example, nitrogen, carbon dioxide, and helium.

The isolation of the product may be accomplished by any general standard procedure, such as distillation, extraction, or crystallization, for example.

The present 1,4,7-tris(halohydrocarbylcarbamoyl)dodecahydro-1,4,7,9b-tetraazaphenalenes and 1,4,7-tris(nitrohydrocarbylcarbamoyl)dodecahydro-1,4,7,9b-tetraazaphenalenes are generally stable, well-defined products, which are soluble in organic solvents, such as alcohols such as ethanol and propanol, and hydrocarbons such as benzene and toluene, for example.

The product of the reaction of hydrocarbon isocyanates and dodecahydro-1,4,7,9b-tetraazaphenalene is known. However, when tested under the same conditions as the 1,4,7-tris(nitrohydrocarbylcarbamoyl)dodecahydro-1,4,7,9b-tetraazaphenalenes, the known products fail to demonstrate any microbiological toxicity against *Aspergillus niger*. In contrast thereto, the nitro-substituted compounds of the prseent invention demonstrate a high degree of bacteriostatic activity as well as fungistatic activity toward *Aspergillus niger*. Moreover, when the known products are tested under the same conditions as the 1,4,7-tris(halohydrocarbylcarbamoyl)dodecahydro-1,4,7,9b-tetraazaphenalenes of this invention, they fail to demonstrate any insecticidal activity on the common housefly. The presence of the halogen substituent imparts a biological toxicant property hitherto unknown to this class of compounds. Acting on the central nervous system of mammals, it becomes a biological toxicant, and on application to the common housefly, it becomes an effective insecticide.

The invention will be further described with reference to the following specific examples. These examples are given for purposes of illustration only and are not to be taken as in any way restricting the invention.

Example 1

This example illustrates the preparation of 1,4,7-tris(p-bromophenylcarbamoyl)dodecahydro - 1,4,7,9b - tetraazaphenalene from p-bromophenyl isocyanate and dodecahydro-1,4,7,9b-tetraazaphenalene.

Tetrahydrofuran (200 ml.) and 12.2 g. (0.067 mole) of dodecahydro-1,4,7,9b-tetraazaphenalene are placed in a 500 ml., three-neck flask equipped with stirrer, thermometer, and nitrogen flow system. A total of 12.2 g. (0.20 mole) of p-bromophenyl isocyanate dissolved in tetrahydrofuran (100 ml.) is added to the flask during a time of 0.5 hour, while the temperature of the reaction is held below 30° C. A white solid is formed during the addition of the isocyanate. Evaporation of the reaction product mixture under reduced pressure and recrystallization of the residual solid from 2-propanol yields 35 g. (70% theoretical yield) of 1,4,7-tris(p-bromophenylcarbamoyl)dodecahydro-1,4,7,9b-tetraazaphenalene, melting at 82–89° C., insoluble in water and soluble in benzene, and analyzing as follows:

Calculated for $C_{30}O_3N_7Br_3$: C, 46.5%; H, 3.9%; N, 12.5%. Found: C, 48.8%; H, 4.6%; N, 11.5%.

Example 2

This example illustrates utilization of 1,4,7-tris(p-bromophenylcarbamoyl)dodecahydro - 1,4,7,9b - tetraazaphenalene as an insecticide.

One microliter of a solution made by dissolving 1 g. of the product of Example 1 in a liter of acetone is applied by means of a topical drop applicator to the dorsum of the thorax of each individual test fly, the test being carried out on 48 hour old female houseflies.

The specimen flies are then held at 68° F. and in the range of 50–60% relative humidity for 24 hours prior to observation for mortality. The presently described procedure is designed so that each fly receives 1.0 microgram of the new dodecahydro-1,4,7,9b-tetraazephenalene. Upon observation for mortality, a 100% kill is reported for the product of Example 1 when tested in the above manner.

When the same procedure as above is followed using 1,4,7 - tris(phenylcarbamoyl)dodecahydro-1,4,7,9b-tetraazaphenalene, a known related compound, upon observation for mortality, the known dodecahydro-1,4,7,9b-tetraazaphenalene showns no insecticidal activity.

The present 1,4,7-tris(halohydrocarbylcarbamoyl)dodecahydro-1,4,7,9b-tetraazaphenalenes are advantageously applied for insecticidal use in the form of sprays or dusts. Useful sprays may be prepared by dispersing the product in water with the aid of a wetting agent to produce sprayable aqueous dispersions. In other procedures, the products may be dissolved in an oil (whereby is meant a water-immiscible organic liquid) and then mixed with an emulsifying agent, to produce an emulsifiable concentrate which may be diluted with water to form an oil-in-water emulsion useful for application to insects, such as the common housefly, Musca domestica. Suitable emulsifying agents for preparing the dispersions and emulsions described above are, for example, long-chain alkylbenzenesulfonates, polyalkylene oxides, and sulfates of long-chain alcohols such as octadecanol, for example; other emulsifying agents suitable for the present purpose are described, for example, in U.S. Department of Agriculture Bulletin E607.

The present 1,4,7-tris(p-bromophenylcarbamoyl)dodecahydro-1,4,7,9b-tetraazaphenalene and other presently useful compound of this invention may also be dissolved in suitable liquified gases such as fluorochloroethanes or methyl chloride and applied to insects from aerosol bombs. Instead of employing liquids as carriers and diluents, insecticidal dusts which contain the present 1,4,7-tris(halohydrocarbylcarbamoyl)dodecahydro-1,4,7,9b-tetraazaphenalenes as active ingredients may be prepared, for example, by incorporating the compounds of this invention with a solid carrier such as talc, bentonite, or fuller's earth, for example.

The amount of the insecticidally active compounds in the composition as applied will vary with the active ingredients, the manner of application, the species which is to be destroyed, and the resistance of the insect sprayed, for example, and formulations and ratio of applications are suitably adjusted in accordance with these factors.

Example 3

This example illustrates the preparation of 1,4,7-tris-(p-nitrophenylcarbamoyl)dodecahydro - 1,4,7,9b - tetraazaphenalene from p-nitrophenyl isocyanate and dodecahydro-1,4,7,9b-tetraazaphenalene.

Tetrahydrofuran (250 ml.) and 13.7 g. (0.75 mole) of dodecahydro-1,4,7,9b-tetraazaphenalene are placed in a 500 ml. three-neck flask equipped wtih stirrer, thermometer, and nitrogen flow system. A total of 36.8 g. (0.20 mole) of p-nitrophenyl isocyanate dissolved in tetrahydrofuran (100 ml.) is added to the flask and a slight temperature rise is observed initially. The reaction is allowed to continue for about 20 hours at 60° C. The solid product is filtered and recrystallized first in a solvent comprising 30% dioxane and later in a solvent comprising 70% benzene and finally in a mixture of pyridine and ether. The yield is 14.8 grams of 1,4,7-tris(nitrophenylcarbamoyl)dodecahydro-1,4,7,9b-tetraazaphenalene, melting at 178° C., and analyzing as follows:

Calculated For $C_{30}O_9N_{10}Br$: C, 52.5%; H, 5.0%; N, 19.8%. Found: C, 53.5%; H, 4.5%; N, 20.8%.

Example 4

This example illustrates the use of 1,4,7-tris(p-nitrophenylcarbamoyl)dodecahydro - 1,4,7,9b - tetraazaphenalene as a microbiological toxicant.

Two milliliters of a 1.0% solution of 1,4,7-tris(p-nitrophenylcarbamoyl)dodecahydro - 1,4,7,9b - tetraazaphenalene are transferred to a tube containing 18 ml. of sterile melted AP-1 agar. The contents of the tube are mixed thoroughly and then poured into sterile plastic petri dishes and allowed to harden. One drop of a suspension containing *Aspergillus niger* is then added to the petri dish. The suspension is prepared by adding 10.0 mls. of a 0.025 percent, sterile surface active agent solution to a stock culture carried on Sabourauds Dextrose Agar slants. The spores are dislodged with a transfer loop and the spore suspension poured into a 100 ml. sterile water blank.

After two days incubation period, the petri dish is transferred to a 25° C. incubator for 3 more days when they are examined for growth or no growth of *Aspergillus niger*. No growth is found.

It is apparent that this invention may be extended to uses beyond those specifically described and that many widely differing embodiments can be made without departing from the spirit and scope thereof as defined herein.

What is claimed is:

1. A 1,4,7-tris(substituted hydrocarbylcarbamoyl)-dodecahydro-1,4,7,9b-tetraazaphenalene of the formula

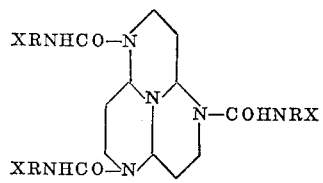

in which R is a phenyl radical or a lower alkyl substituted phenyl radical and X is chosen from the group consisting of nitro radical, chlorine, bromine, iodine and fluorine.

2. A compound of claim 1 in which each R is a phenyl radical.

3. A compound as defined in claim 1 in which X is bromine.

4. 1,4,7,-tris(bromophenylcarbamoyl)dodecahydro-1,4,7,9b-tetraazaphenalene.

5. A compound as defined in claim 1 in which X is a nitro radical.

6. 1,4,7-tris(nitrophenylcarbamoyl)dodecahydro-1,4,7,9b-tetraazaphenalene.

References Cited

UNITED STATES PATENTS 3,112,314   11/1963   Van Winkle _____ 260—256.4

ALEX MAZEL, *Primary Examiner.*

R. J. GALLAGHER, *Assistant Examiner.*

U.S. Cl. X.R.

424—251